US011898515B2

(12) United States Patent
Xing et al.

(10) Patent No.: US 11,898,515 B2
(45) Date of Patent: Feb. 13, 2024

(54) SYSTEMS AND METHODS FOR A VEHICLE ENGINE FUEL SYSTEM

(71) Applicant: Ford Global Technologies, LLC, Dearborn, MI (US)

(72) Inventors: Yun Xing, Canton, MI (US); John Erik Mikael Hellstrom, Ann Arbor, MI (US); Natalie Remisoski, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/655,437

(22) Filed: Mar. 18, 2022

(65) Prior Publication Data

US 2023/0296067 A1 Sep. 21, 2023

(51) Int. Cl.
*F02D 41/02* (2006.01)
*F02D 41/22* (2006.01)

(52) U.S. Cl.
CPC ........... *F02D 41/22* (2013.01); *F02D 41/021* (2013.01); *F02D 2200/0602* (2013.01)

(58) Field of Classification Search
CPC ........ F02D 41/02; F02D 41/021; F02D 41/22; F02D 2200/0602; F02M 35/09; B01D 46/446
See application file for complete search history.

(56) References Cited

U.S. PATENT DOCUMENTS 6,974,537 B2 12/2005 Abdelqader
8,781,673 B2 7/2014 Nunn et al.
9,599,071 B2 * 3/2017 Dudar ................ F02M 25/0836
9,739,244 B2 * 8/2017 Dudar ................... F02D 41/003
(Continued)

FOREIGN PATENT DOCUMENTS

CN 105008707 A 10/2015
DE 102007061125 A1 7/2008
(Continued)

OTHER PUBLICATIONS

Xing, Y. et al., "Method and System for Learning Water Content in Fuel," U.S. Appl. No. 17/448,670, filed Sep. 23, 2021, 34 pages.
(Continued)

*Primary Examiner* — John Kwon
*Assistant Examiner* — Johnny H Hoang
(74) *Attorney, Agent, or Firm* — Vincent Mastrogiacomo; McCoy Russell LLP

(57) ABSTRACT

Methods and systems are provided for a vehicle engine fuel system. In one embodiment the method comprises indicating degradation of each of a low-pressure fuel pump and a fuel filter based on a comparison of a pressure differential between a high-pressure pump pressure setting to an actual pressure and a demanded fuel flow to an engine, the indication distinguishing between pump ageing and filter degradation. The method may include adjusting operation of the low-pressure fuel pump in response to the comparison of the high-pressure pump pressure setting and pressure of fuel entering a high-pressure pump. In one example, the fuel filter may be positioned to filter fuel drawn from a fuel tank before entering the low-pressure fuel pump.

18 Claims, 11 Drawing Sheets

(56) References Cited

U.S. PATENT DOCUMENTS

| | | | | |
|---|---|---|---|---|
| 2007/0079792 | A1* | 4/2007 | Dingler | F02D 41/22 73/114.38 |
| 2008/0150552 | A1 | 6/2008 | Straub | |
| 2008/0269984 | A1 | 10/2008 | Achleitner et al. | |
| 2009/0007885 | A1* | 1/2009 | Serra | F02M 63/0215 123/456 |
| 2013/0138325 | A1* | 5/2013 | Lee | F01N 3/0231 701/103 |
| 2013/0311067 | A1* | 11/2013 | Stockner | F02D 19/0694 701/104 |
| 2015/0198125 | A1* | 7/2015 | Take | F02D 41/22 123/457 |
| 2015/0226630 | A1* | 8/2015 | Nakagawa | G01M 3/223 73/40.7 |
| 2015/0360152 | A1* | 12/2015 | Kato | F02M 37/40 210/85 |
| 2017/0096974 | A1* | 4/2017 | Dudar | F02D 41/003 |
| 2018/0216566 | A1* | 8/2018 | Taxon | F02D 41/3845 |
| 2019/0285020 | A1* | 9/2019 | Dudar | F02D 41/22 |
| 2021/0277845 | A1* | 9/2021 | Taxon | F02D 41/3827 |

FOREIGN PATENT DOCUMENTS

| | | |
|---|---|---|
| EP | 1733129 B1 | 10/2009 |
| EP | 3017159 B1 | 10/2017 |

OTHER PUBLICATIONS

Xing, Y. et al., "Method and System for Water in Fuel Prognostic Monitor," U.S. Appl. No. 17/448,671, filed Sep. 23, 2021, 27 pages.

* cited by examiner

SYSTEMS AND METHODS FOR A VEHICLE ENGINE FUEL SYSTEM

FIELD

The present description relates generally to methods for indicating low-pressure fuel pump and fuel filter degradation for a vehicle engine fuel system.

BACKGROUND/SUMMARY

A vehicle fuel system may include a low-pressure fuel pump and a fuel filter for providing fuel for combustion to an engine system and to protect high value components. The low-pressure fuel pump delivers a flow of fuel to maintain desired system performance. The fuel filter removes small particles in fuel to prevent premature degradation of an engine and other high value components. Low-pressure fuel pump ageing and fuel filter clogging may reduce the effectiveness of their respective functions and thus deteriorate system performance.

Application CN105008707 describes a system for diagnosing fuel filter clogging including a negative fuel pressure sensor that detects the negative fuel pressure downstream from a fuel filter connecting a fuel tank and a fuel pump. The system includes a control unit that reads the respective output signals from the negative pressure sensor and an atmospheric pressure sensor. Fuel filter clogging may be diagnosed when the fuel pressure is equal to or less than a threshold value.

However, the inventors herein have recognized potential issues with such systems. As one example, the system may not accurately account for low-pressure fuel pump degradation, specifically. Moreover, in some examples, low-pressure fuel pump ageing and fuel filter clogging may produce similar degradation signals and may present challenges for diagnosing appropriate service. In some examples, a type of fuel (e.g., fuel brand, quality), vehicle characteristics, vehicle operating parameters such as engine power and fuel temperature, driving style of an operator, and other factors can influence low-pressure fuel pump and fuel filter degradation. In this way, the inventors herein have recognized that a system that accounts for various influential factors to continuously learn and update a model of the fuel system based on newly incoming operating data may provide custom diagnostic information and service recommendations.

In one example, the issues described above may be addressed by a method for a vehicle engine fuel system. In one example, the method may include indicating degradation of each of a low-pressure fuel pump and a fuel filter based on a comparison of a pressure differential and a demanded fuel flow to an engine, the indication distinguishing between pump ageing and filter degradation. In this way, a system for detecting degradation of a low-pressure fuel pump and a fuel filter insures the performance of the vehicle.

As one example, the method may include the fuel filter positioned to filter fuel drawn from a fuel tank before entering the low-pressure fuel pump. The method may include adjusting operation of the low-pressure fuel pump in response to the comparison of the high-pressure pump setting and pressure of fuel entering a high-pressure pump, and may further include adjusting based on a feed-forward adjustment of the high-pressure pump setting. In one example, the method may include taking default action to adjust engine operation in response to the indication and the distinguishing between pump ageing and filter degradation.

In a further example, the indication may be based on a predetermined relationship between a normalized orifice area estimated with an undegraded low-pressure fuel pump and an undegraded filter and degraded filter over vehicle miles. The predetermined relationship may then be utilized to generate a real-time estimate of normalized orifice area during vehicle operation. As another example, the real-time estimate of normalized orifice area may be compared to a threshold to where normalized orifice area decreasing below the threshold may indicate filter replacement. Upon filter replacement, the real-time estimate of normalized orifice area may be captured for comparison with previous real-time estimates of normalized orifice area at previous filter replacements to generate an ageing estimate of the low-pressure fuel pump. The degradation of the low-pressure fuel pump may be indicated based on the ageing estimate.

As another example, a degradation estimate of the low-pressure fuel pump and the fuel filter may be based on a machine learning model and a fuel system usage map based on fuel flow and fuel temperature. In one example, the degradation estimate may be a clogging estimate. In another example, the degradation estimate may be an ageing estimate. The degradation estimate of the low-pressure fuel pump and the fuel filter may be based on a cloud-sourced data structure including filter brand, fuel brand, mileage, and the fuel system usage map. The method may further include generating a suggestion for a type of fuel filter to replace a determined degraded fuel filter. In this way, the method provides fuel system performance monitoring to a vehicle operator enabling regular maintenance service and preventive service planned with more flexibility, efficiency, and greater value to customer. The method provides for custom ongoing fuel system performance monitoring, and may increase performance of the vehicle, enhance vehicle ownership experience, and increase revenue of a manufacturer.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
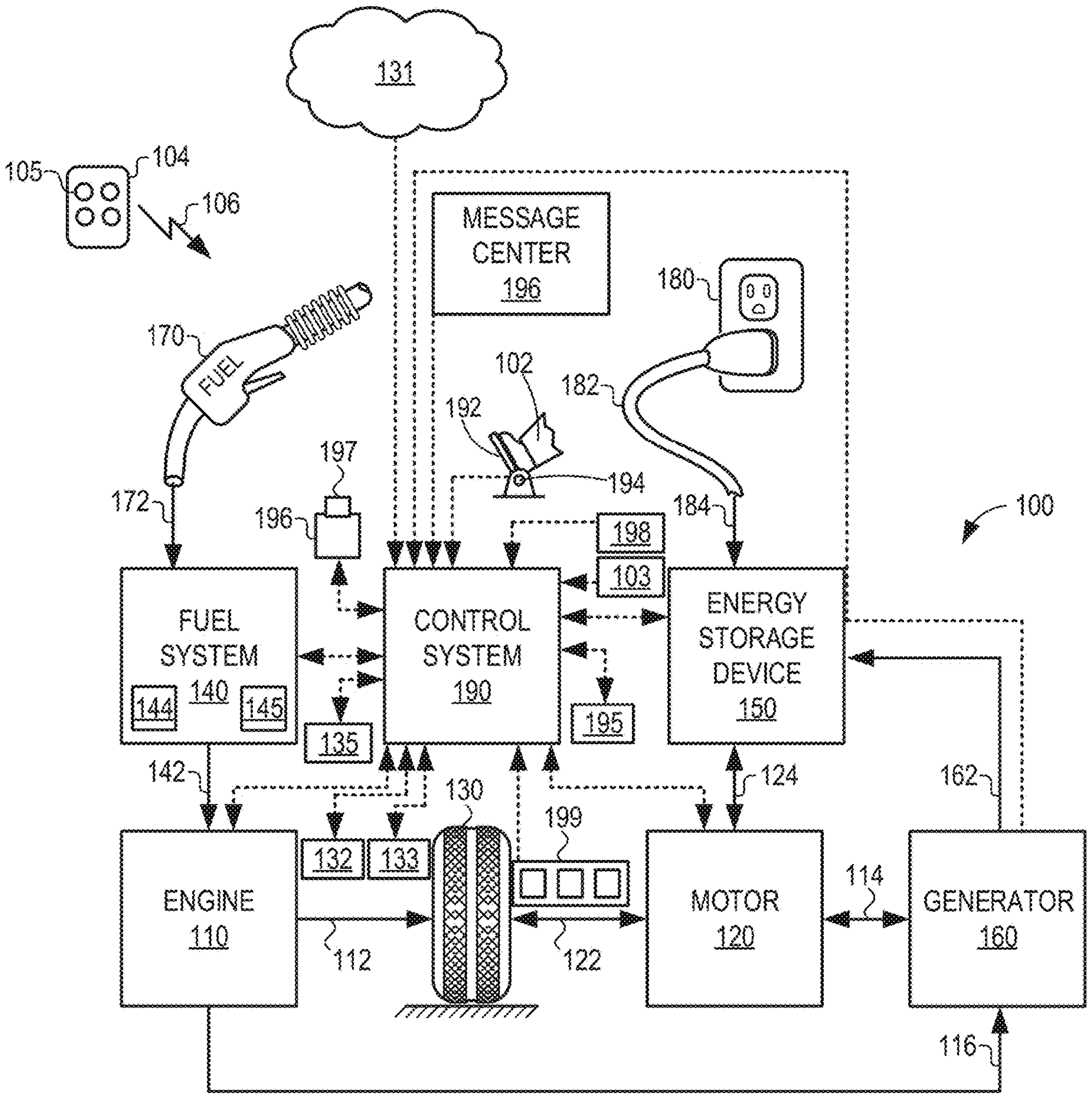
FIG. 1 illustrates a schematic of an engine included in a hybrid vehicle.
Figure 2:
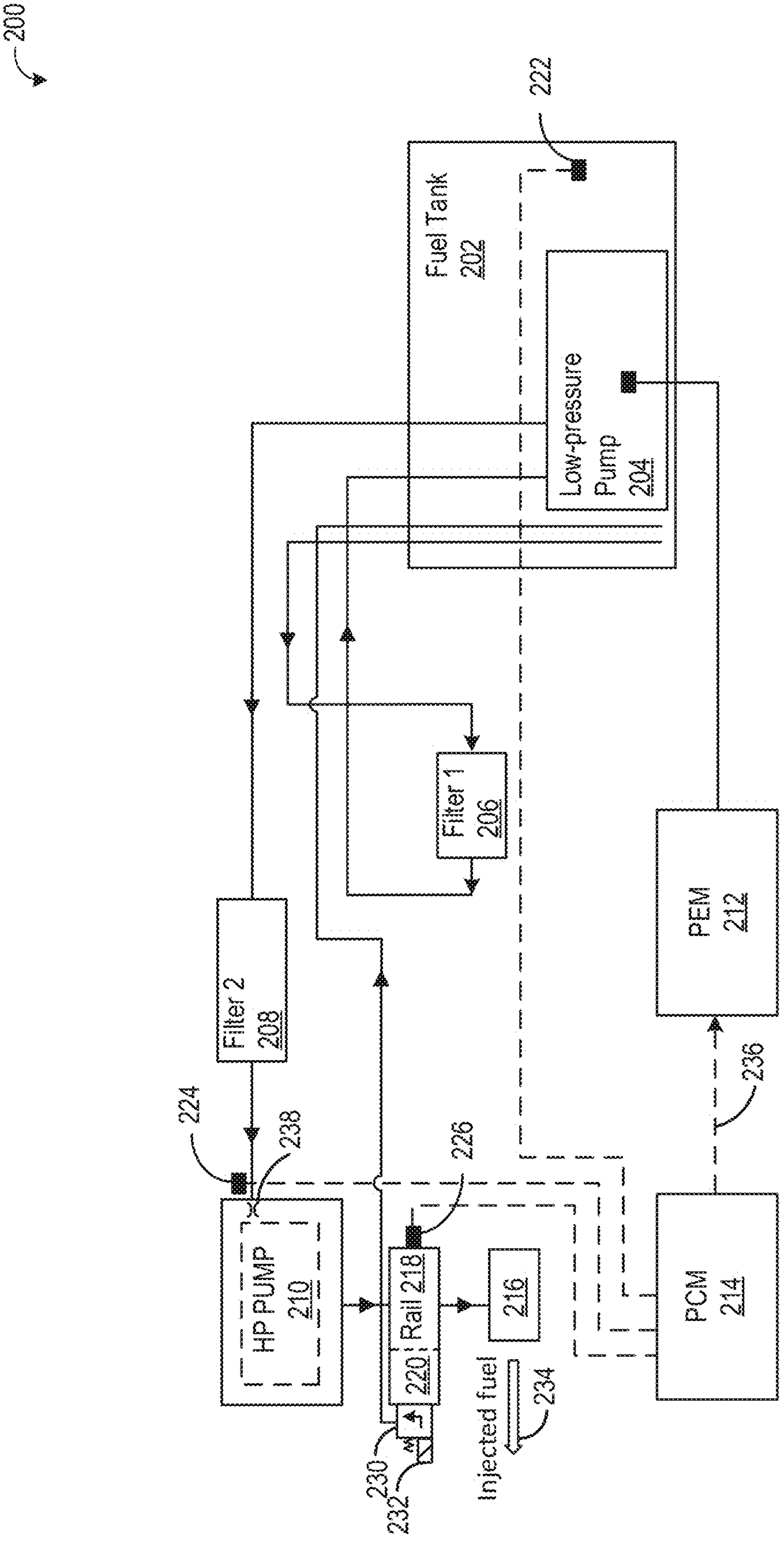
FIG. 2 illustrates a schematic of a fuel low-pressure system.
Figure 3:
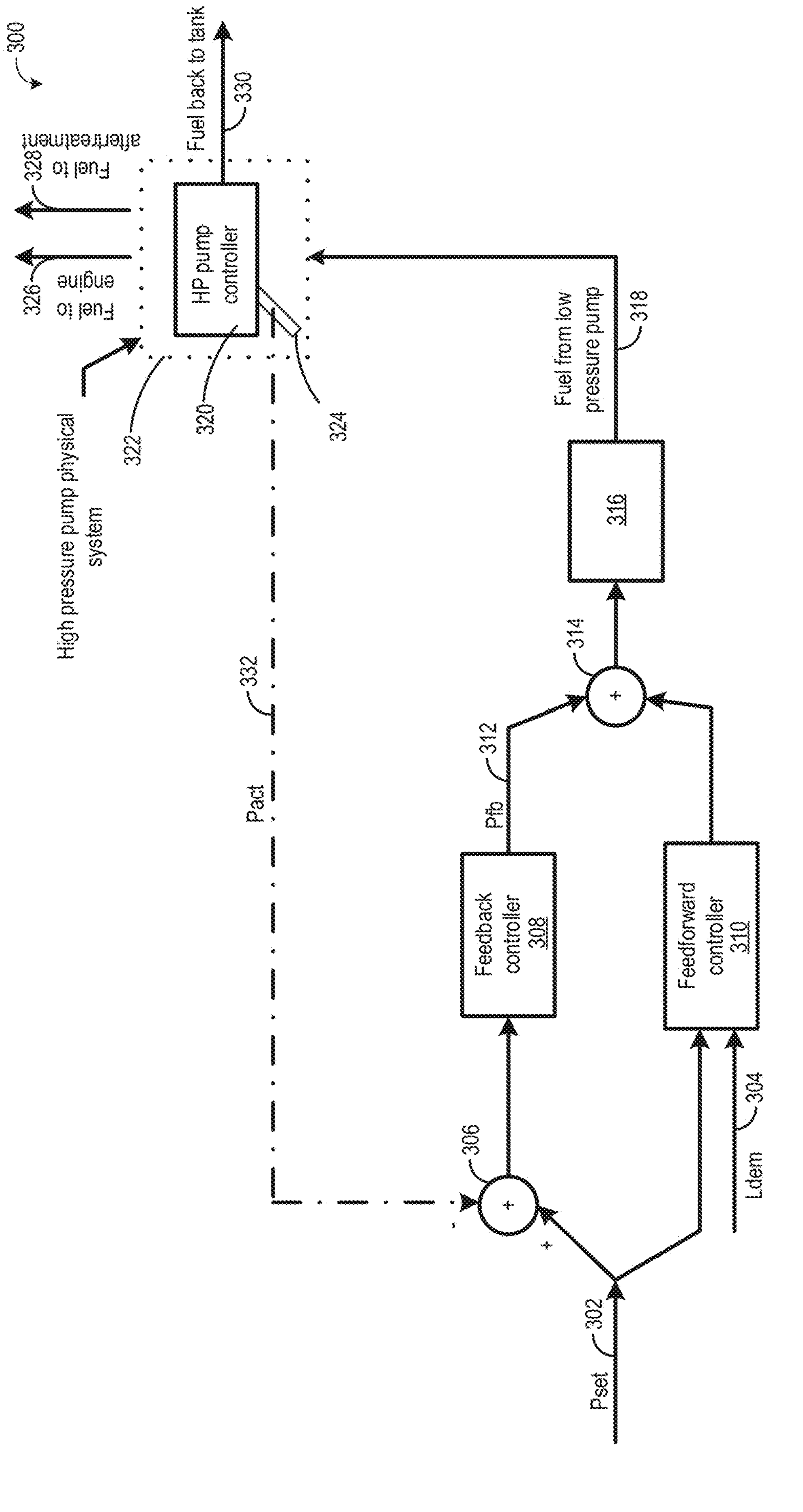
FIG. 3 illustrates a schematic of a control structure for a fuel low-pressure system.
Figure 4:
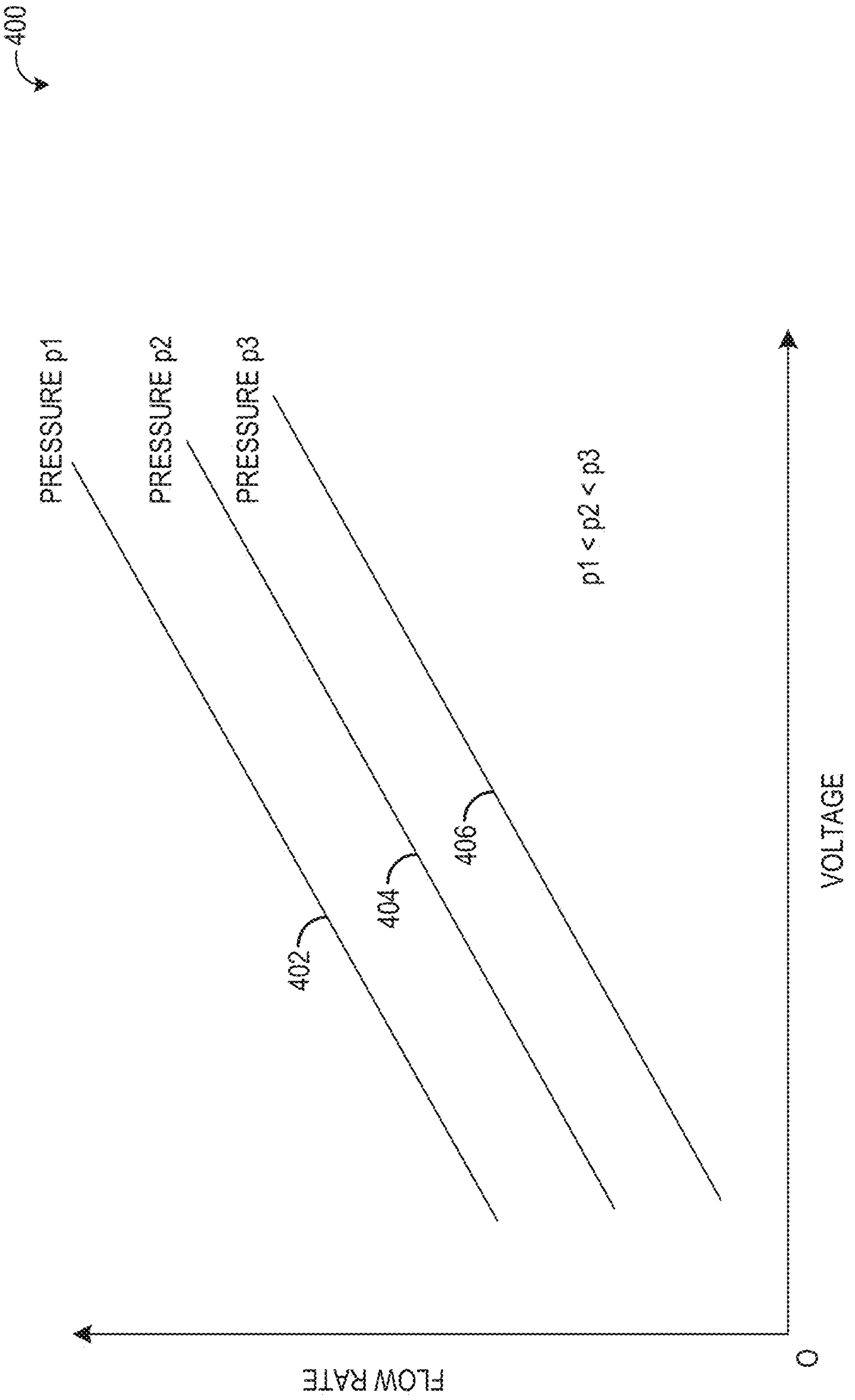
FIG. 4 illustrates a plot of low-pressure fuel pump delivery flow rate vs. applied voltage.
Figure 5:
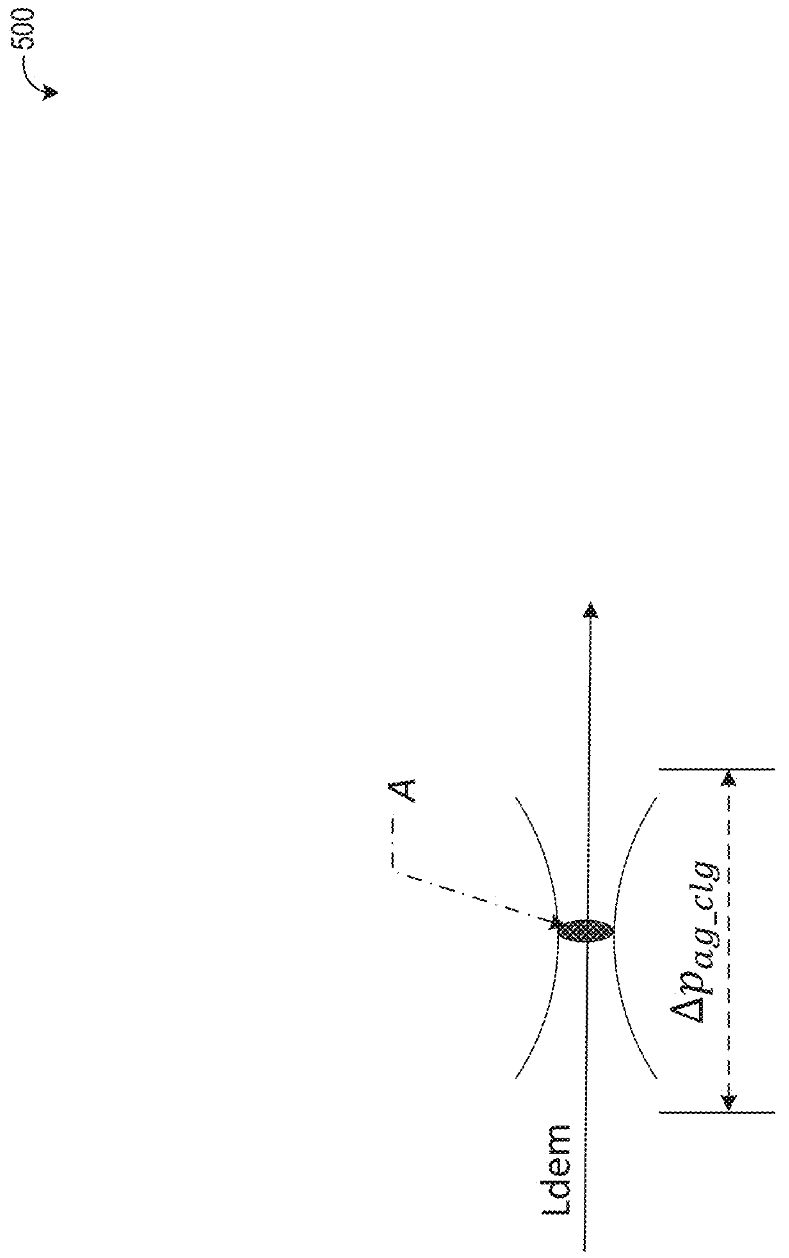
FIG. 5 illustrates a conceptual low-pressure fuel pump orifice.
Figure 7:
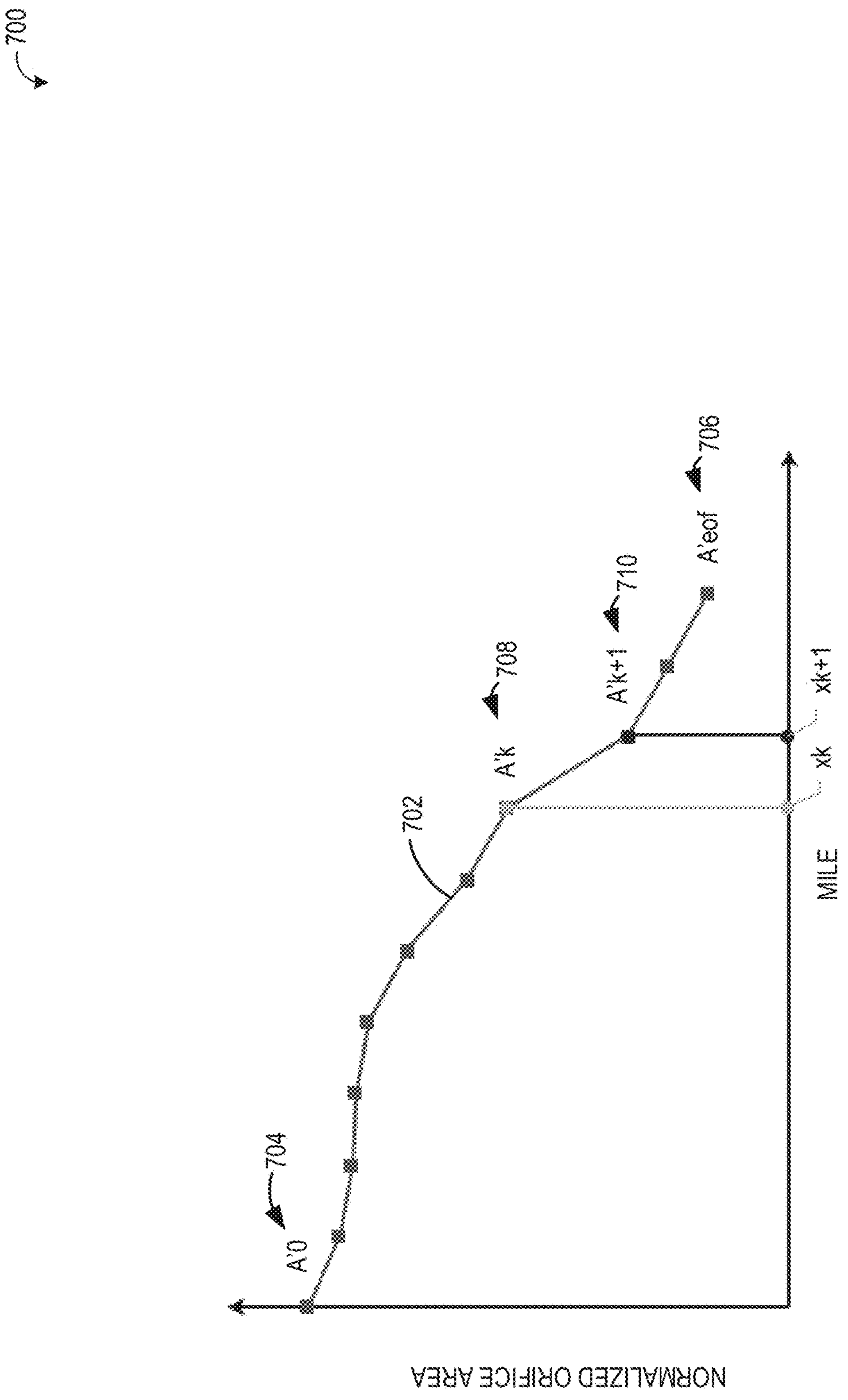
FIG. 7 illustrates a plot of a fuel filter clogging sensing event.
Figure 8:
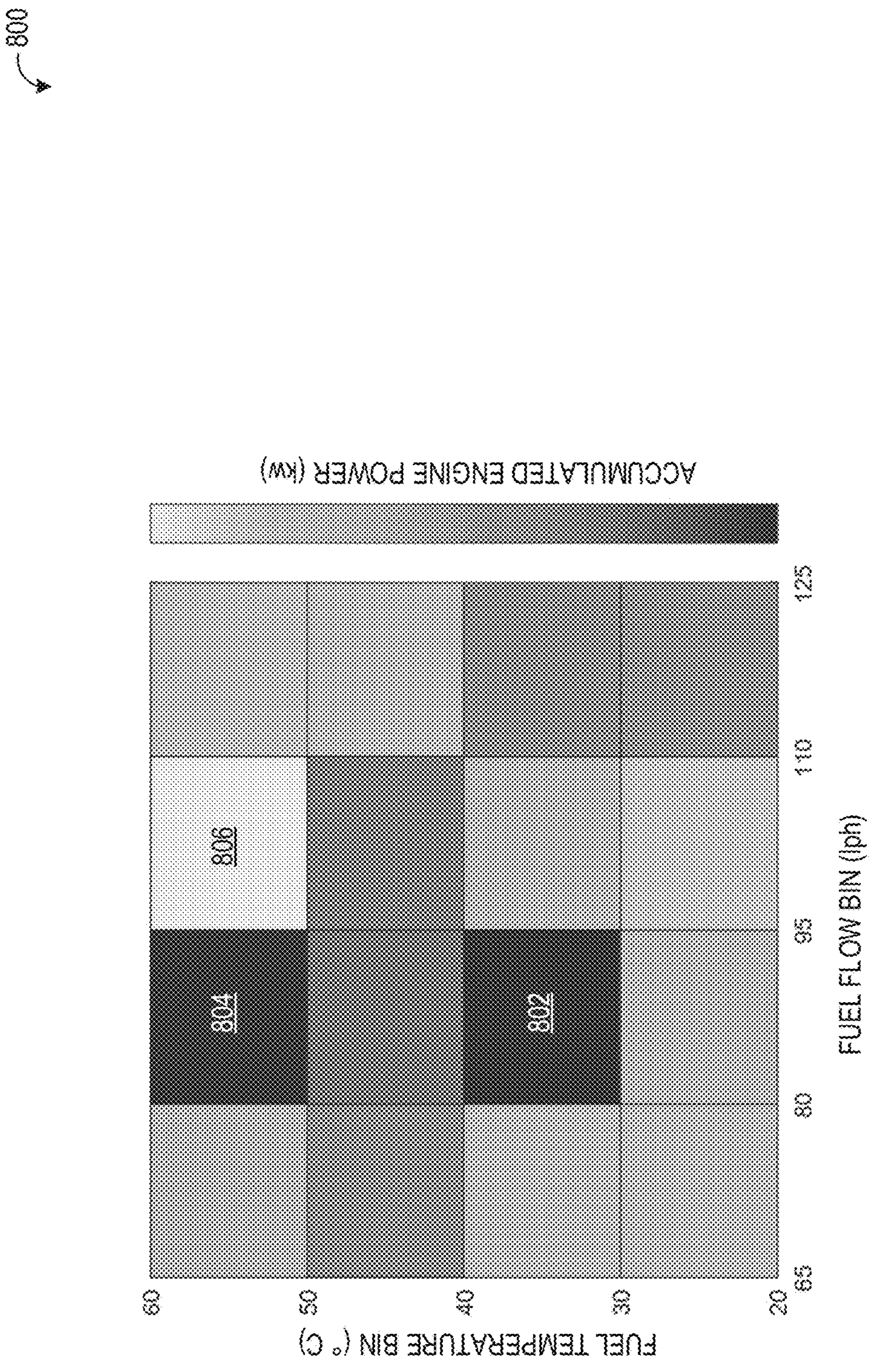
FIG. 8 illustrates an example fuel system usage map.
Figure 9:
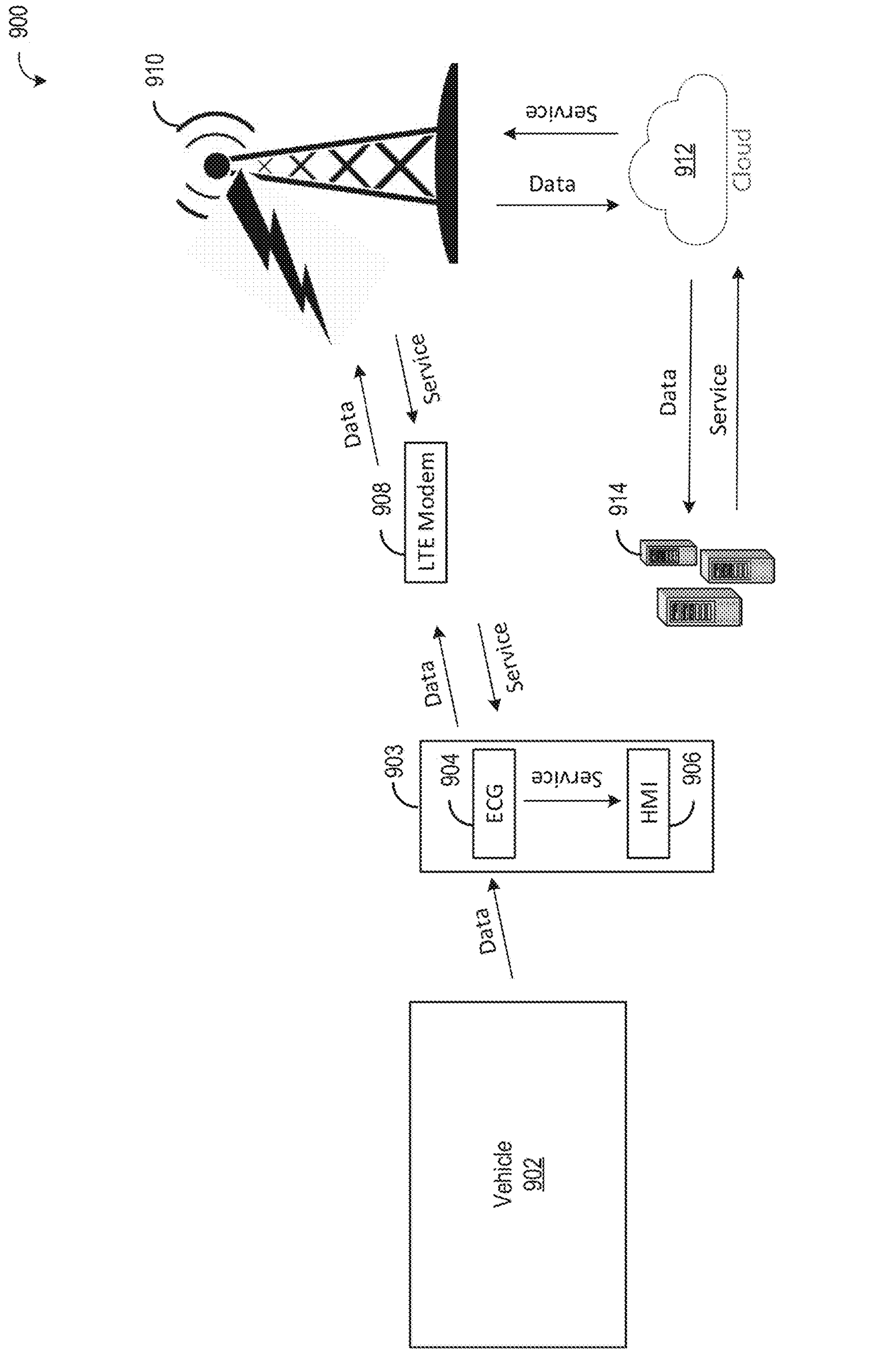
FIG. 9 illustrates data and service communication for a cloud-connected vehicle system.

The following description relates to methods for a vehicle engine fuel system including indicating degradation of each a low-pressure fuel pump and a fuel filter based on a comparison of a pressure differential between a high-pressure pump pressure setting to an actual pressure and a demanded fuel flow to an engine, the indication distinguishing between pump ageing and filter degradation. As one example, degradation may be determined based on a real-time sensed conceptual orifice area compared with the conceptual orifice area of an undegraded fuel pump and fuel filter. The method for indicating degradation of a low-pressure fuel pump and a fuel filter may monitor the performance of an engine fuel system in a vehicle system. A schematic of an example hybrid vehicle system is shown in FIG. 1. A schematic of an example engine fuel system is shown in FIG. 2. The method for indicating degradation of a low-pressure fuel pump and a fuel filter may be implemented by a control system of the vehicle. An example control system for implementing one or more fuel system control routines is shown in FIG. 3. A graphical representation of feedback control may allow feedback control voltage to be converted to an equivalent pressure drop for calculating area for a conceptual orifice. Such a graphical representation is shown in FIG. 4. A conceptual orifice is shown in FIG. 5. A progression curve representing effective orifice area for estimating low-pressure fuel pump ageing and fuel filter degradation is shown graphically in FIG. 6. An example plot of a fuel filter clogging sensing event that may be used in an intelligent system is shown in FIG. 7. Fuel flow, fuel temperature and engine power may be used to build a fuel system usage map such as shown in FIG. 8. A cloud connected vehicle system is shown in FIG. 9. A sample machine learning model for an example fuel and filter combination is given in FIG. 10. A flow chart for a control routine to monitor the performance of a cloud-connected fuel system is shown in FIG. 11.

FIG. 1 illustrates an example vehicle propulsion system 100. Vehicle propulsion system 100 includes an engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with vehicle propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. As one example, control system 190 may determine a driving style of the vehicle operator based on sensory feedback from the sensors of the system, such as pedal position sensor 194. Furthermore, in some examples control system 190 may be in communication with a remote engine start receiver 195 (or transceiver) that receives wireless signals 106 from a key fob 104 having a remote start button 105. In other examples, a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it may be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via fuel level sensor 145. The level of fuel stored at fuel tank 144 as identified by fuel level sensor 145 may be communicated to the vehicle operator, for example, via a fuel gauge or indication in a vehicle instrument panel 196. In one embodiment, the fuel level sensor 145 and other sensors of the system (e.g., fuel system sensors described in FIG. 2) may send signals to control system 190 where the signals feed into various control routines programmed into the system. For example, control system 190 may determine a fuel refilling habit of an operator based on fuel type selection from fuel refilling events. Fuel refilling habit, driving style, other signals may be used in conjunction with signals from other vehicles in a cloud enable machine learning model to generate fuel system component recommendations to the vehicle operator. An example control routine for monitoring the performance of a fuel system in a cloud-connected vehicle and generating service recommendations is given in FIG. 11.

The vehicle propulsion system 100 may also include a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Vehicle propulsion system 100 may also include an onboard navigation system 132 (for example, a Global Positioning System) with which an operator of the vehicle may interact. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In some examples, vehicle propulsion system 100 may include lasers, radar, sonar, acoustic sensors 133, which may enable vehicle location, traffic information, etc., to be collected via the vehicle.

The vehicle propulsion system 100 may be in wireless communication with a wireless network 131. The control system 190 may communicate with the wireless network 131 via a modem, a router, a radio signal, or the like. Data regarding various vehicle system conditions may be communicated between the control system 190 and the wireless network. Additionally or alternatively, the wireless network 131 may communicate conditions of other vehicles to the control system 190.

Turning now to FIG. 2, the vehicle system may include a fuel system, such as fuel system 200. In the example, fuel is distributed from fuel tank 202 to one or more of injectors 216 from a high pressure accumulator which may be the fuel injector rail 218. Rail 218 is coupled to diverter 220 and fed by high-pressure fuel pump, high-pressure pump 210. Fuel system includes first pressure relief valve 230 coupled between diverter 220 and a second pressure relief valve 232. Fuel enters the system and is carried from first pressure relief valve 230 to fuel tank 202. From fuel tank 202, fuel is taken up and passed through first filter 206 prior to entering low-pressure fuel pump 204. First filter 206 is positioned to filter fuel drawn from fuel tank 202 before entering low-pressure fuel pump 204. From low-pressure fuel pump 204, fuel is carried through second filter 208 to high-pressure pump 210. From high-pressure pump 210, fuel is distributed from rail 218 to the one or more injectors 216 for providing injected fuel 234 to an internal combustion engine (e.g., engine 110). In one example, high-pressure pump 210 is controlled via an inlet metering valve 238 based on a pressure feedback signal from rail 218.

In one example, pump control module (PCM) 214 may receive control signals from sensors of fuel system 200 such a fuel level sensor signal from fuel level sensor 222 inside fuel tank 202, a pressure signal from rail pressure sensor 226, and temperature and pressure signals from P/T combo sensor 224 inside the high-pressure pump 210. PCM 214 may send a fuel pump control signal 236 to pump electronics module 212 to control low-pressure fuel pump 204 to deliver estimated fuel pressure at the inlet of high-pressure pump.

FIG. 3 shows an example control structure 300 that may be implemented in a control system of a vehicle such as PCM 214 in FIG. 2. In the example, low-pressure fuel pump control unit 316 controls a flow of fuel 318 to high-pressure pump physical system 322. High-pressure pump physical system 322 flows fuel to engine 326 and flows fuel to aftertreatment system 328. High-pressure pump control system 320 controls a flow of fuel back to the fuel tank 330. In one example, a pressure setting (Pset) 302 for an inlet of the high-pressure pump physical system 322 (e.g., inlet metering valve 238) is determined based on high-pressure pump operating conditions and separate feedback control via high-pressure pump control system 320 controlling settings for the high-pressure pump physical system 322 to maintain a desired rail pressure. In the example, pressure setting 302 is compared to an actual pressure sensor reading (Pact) 332 read by a high-pressure pump pressure and temperature sensor 324. Pressure setting 302 for the high-pressure pump inlet is compared to an actual pressure sensor reading (Pact) 332. The difference 306 is sent to feedback controller 308 to calculate a pressure feedback control signal (Pfb) 312. The pressure feedback control signal 312 is added to an output of feedforward controller 310. A summation 314 is sent to low-pressure fuel pump control unit 316 to deliver a flow of fuel 318 estimated to maintain pressure setting 302 at the inlet of high-pressure pump physical system 322.

Feed-forward control may be built around the pressure setting 302 and upstream fuel flow demand (Ldem) 304 for a new low-pressure fuel pump unit (e.g., low-pressure fuel pump control unit 316) and/or a new fuel filter (e.g., first filter 206, second filter 208 in FIG. 2). In one example, as the low-pressure fuel pump ages and the fuel filter clogs with use, the output of feed-forward control alone may not maintain the pressure setting 302. In such an example, the output of the pressure feedback control signal 312 may not be equal to 0 and will compensate the pump ageing and/or filter degradation of the fuel pressure system to maintain pressure setting 302. The pressure setting 302 at the input of the high-pressure pump physical system 322 is compared to actual pressure sensor reading 332 and the difference may be used to calculate the pressure feedback control signal 312. In such an example, the pressure feedback control signal 312 allows computation of estimated fuel flow to maintain pressure setting 302 thus compensating feedforward controller 310 during low-pressure fuel pump ageing and/or fuel filter clogging.

In this way, sensors of the fuel system produce control signals that enable indicating degradation of a low-pressure fuel pump and fuel filter based on comparing a pressure differential between a pressure pump pressure setting to an actual pressure and demanded fuel flow to the engine, the indication distinguishing between pump ageing and filter degradation. In one example, the control signals may indicate degradation based on a conceptual orifice area between a degraded and undegraded fuel system. The control system may include instructions for adjusting the operation of the low-pressure fuel pump in response to the comparison of the high-pressure pump pressure setting and pressure of fuel entering a high-pressure pump. The control system may additionally or alternatively include instructions for adjusting operation of the low-pressure fuel pump in response to the comparison of the high-pressure pump pressure setting and pressure of fuel entering the high-pressure pump, and further based on a feed-forward adjustment of the high-pressure pump pressure setting.

Figure 6:
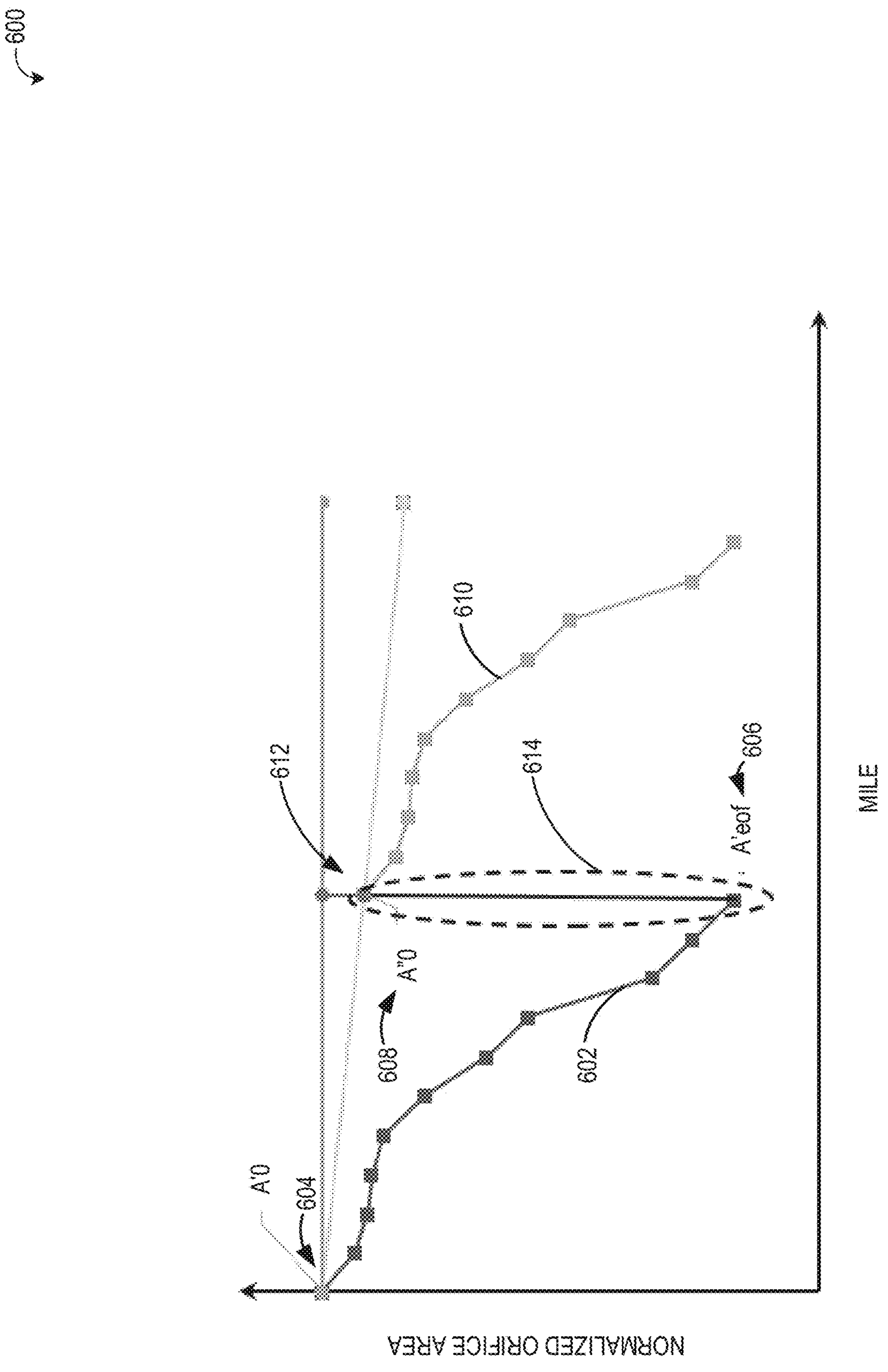
FIG. 6 illustrates a plot of effective orifice area for a low-pressure fuel pump and fuel filter over vehicle mileage.

FIGS. 4-6 describe embodiments of the method for a vehicle engine fuel system including indicating pump ageing and/or filter degradation based on a predetermined relationship between a normalized orifice area estimated with an undegraded low-pressure fuel pump and an undegraded filter and degraded filter over vehicle miles, the predetermined relationship utilized to generate a real-time estimate of normalized orifice area during vehicle operation. In one example, when the real-time estimate of normalized orifice area decreases below a threshold, fuel filter replacement may be indicated. Upon filter replacement, the real-time estimate of normalized orifice area may be captured for comparison with previous real-time estimates of normalized orifice area at previous filter replacements to generate an ageing estimate of the low-pressure fuel pump, degradation of the low-pressure fuel pump indicated based on the ageing estimate.

Turning now to FIGS. 4 and 5, a graphical relationship shown in plot 400 (in FIG. 4) allows feedback control to be converted to an equivalent pressure drop along with a conceptual orifice equation based on the conceptual orifice 500 (in FIG. 5). The example plot 400 illustrates typical curves governing an electric low-pressure fuel pump (e.g., low-pressure fuel pump 204 in FIG. 2). The x-axis depicts increasing voltage and the y-axis depicts increasing flow rate. Three curves are illustrated: a first pressure curve 402, a second pressure curve 404, and a third pressure curve 406. The curves show flow rate increasing with increasing voltage. In the example, for an equivalent voltage the flow rate is highest for first pressure curve 402 and lowest for third pressure curve 406 such. The pressure feedback control signal (e.g., pressure feedback control signal (Pfb) 312 in FIG. 3) is proportional to voltage applied to the low-pressure fuel pump. In the example, the pressure feedback control signal is highest for the third pressure curve 406 and lowest for the first pressure curve 402. The pressure feedback control signal may be easily converted to an equivalent pressure drop: $\Delta p_{ag\_clg}$. In one example, the first pressure curve 402 may be generated by a fuel system with relatively newer fuel filter and fuel pump than the fuel system that produces the second pressure curve 404 and third pressure curve 406.

In FIG. 5, conceptual orifice 500 is shown describing pump ageing and/or fuel filter clogging (e.g., degrading). A clogging condition of the fuel system (e.g., fuel system 200 in FIG. 2) may be measured by evaluating the effective area A of conceptual orifice 500 based on system operating parameters. A first equation to calculate orifice area A is shown as below:

$$A = k \cdot \frac{Ldem}{c_d \cdot \sqrt{2 \cdot \frac{\Delta p_{ag\_clg}}{\rho}}} = k' \cdot \frac{Ldem}{\sqrt{Pfb}} \quad (1)$$

In the above equation (1), A is equivalent orifice area, k and k' are scale factors for unit conversion and scaling, ρ is the density for fuel flow, $C_d$ is coefficient of discharge, Ldem is the demanded upstream fuel flow (e.g., upstream fuel flow demand (Ldem) 304 in FIG. 3), and Pfb is output from the low-pressure system feed-back control (e.g., pressure feed-back control signal (Pfb) 312 in FIG. 3). In one embodiment, Ldem and Pfb are available signals in the control software for existing vehicle system and components therein, such as described in FIGS. 1-3. In this way, the system for a fuel health monitor has an advantage of using existing control system signals from sensors of the vehicle system.

Based on the first equation, a value $A_0$ may be calculated for a first condition, e.g., new low-pressure fuel pump and fuel filter, no clogging, no ageing. Another value $A_{eof}$ may be calculated for a second condition where a low pressure diagnostic code set for fuel filter degradation, e.g., end of life. A normalized scale may be established for any value $A'_n$, between $A_0$ and $A_{eof}$. In one example, normalized orifice area $A'_n$, may be used to infer a fuel system clogging condition.

Turning to FIG. 6, a plot 600 is shown illustrating fuel system performance including fuel filter clogging and low-pressure fuel pump ageing. Plot 600 shows vehicle mileage on the x-axis and normalized orifice area on the y-axis. In one example, fuel filter clogging conditions may be detected using the control system components described with respect to FIGS. 1-3 and calculated following the strategy described in FIG. 4 and FIG. 5. A vehicle odometer reading (e.g., mileage) corresponding to normalized orifice area $A'_n$, may be plotted. In an example, during the life of a fuel filter, a progression curve may be produced. The plot shows a first progression curve 602 from sensed normalized orifice area $A'_0$ 604 at zero (or near zero) miles to normalized orifice area $A'_{eof}$, of 606 indicating fuel filter degradation at increased vehicle mileage. Normalized effective orifice area progression over vehicle mileage may be modeled by a second equation:

$$y = c \cdot x + b \quad (2)$$

In the above equation (2), x is vehicle mileage, and y is normalized effective orifice area. In a third equation, let θ denote the parameters of the above linear model:

$$\theta = \begin{bmatrix} c \\ b \end{bmatrix} \quad (3)$$

And pairs of $\{(x_i, y_i), i=0,1,2, \ldots, N\}$ can be obtained by the calculations described in previous steps:

$$X_N = \begin{bmatrix} x_0 1 \\ x_1 1 \\ \ldots \\ x_n 1 \end{bmatrix} \quad Y_N = \begin{bmatrix} y_0 \\ y_1 \\ \ldots \\ y_n \end{bmatrix} \quad (4)$$

By selecting a forgetting factor λ, 0<λ<2, a recursive least-squares estimator for slow time-varying parameters can be implemented below:

$$\varphi(n+1) = [x_{n+1} 1] \quad (5)$$

$$P(n) = (X_N^T \cdot X_N)^{-1} \quad (6)$$

$$\hat{\theta}(n+1) = \hat{\theta}(n) + K(n+1)[y(n+1) - \varphi(n+1)\hat{\theta}(n)] \quad (7)$$

$$K(n+1) = P(n)\varphi^T(n+1)[\lambda + \varphi(n+1)P(n)\varphi^T(n+1)]^{-1} \quad (8)$$

$$P(n+1) = \frac{[I - K(n+1)\varphi(n+1)]P(n)}{\lambda} \quad (9)$$

After $\hat{\theta}$ has been obtained by the above equations, the remaining distance to $A'_{eof}$ (at which point the fuel filter needs to be replaced) can be calculated with a tenth equation as: distance to $$A'_{eof} = \frac{A'_{eof} - A'}{\hat{c}} \quad (10)$$

$\hat{c}$ is the estimated rate of degradation obtained from the seventh equation as defined in the third equation.

As shown in plot 600, when normalized orifice area A' n reaches to A' eof 606, the fuel filter reaches degradation (e.g., filter clogged, end of life). The system may recommend replacement to ensure the fuel system functioning. In the example, after fuel filter replacement, the (new) sensed normalized orifice area is expected to increase from $A'_{eof}$ 606 to $A''_0$ 608, as indicated by the dashed oval 614. A second progression curve 610 representing a second, e.g., new, filter may be used by the system to estimate future fuel filter replacement service. Arrow 612 indicates the difference in normalized orifice area between $A'_0$ 604 (e.g., for the first filter) and $A''_0$ 608 (e.g., for the second filter). In one example, the difference in normalized orifice area between $A'_0$ 604 and $A''_0$ 608 for the first and second filter (or other future replacement fuel filters) is expected to increase in absolute terms as the low-pressure fuel pump ages. In one embodiment, the control system may generate an indication including an operator notification to schedule maintenance service for a low-pressure fuel pump when the normalized orifice area $A''_0$ 608 (after a fuel filter replacement event) is less than a threshold value $A_{thres}$, as demonstrated by the eleventh equation:

$$A''_0 < A_{thres} \quad (11)$$

In one example, $A_{thres}$ may be a nonzero preset threshold.

In this way, an orifice area calculation based on sensor signals from the vehicle system may detect and differentiate between fuel filter clogging and fuel pump ageing to provide custom maintenance solutions to a vehicle operator. Following filter replacement, by capturing real-time estimates of normalized orifice area for comparison with previous real-time estimates of normalized orifice area at previous filter replacements, fuel system performance data may be used to generate an ageing estimate of the low-pressure fuel pump and degradation of the low-pressure fuel pump indicated therefrom. Moreover, such fuel system data may be used in a machine learning system on a cloud server to explore fuel system performance under different combinations and usage. As one example, the ageing estimate of the low-pressure fuel pump may be based on a machine learning model and a fuel system usage map based on fuel flow and fuel temperature. As a further example, the ageing estimate of the low-pressure fuel pump may be based on a cloud-sourced data structure including filter brand, fuel brand, mileage, and the fuel system usage map. As one example, in communication with cloud-sourced data, the system may generate a suggestion for a type of fuel filter to replace a determined degraded fuel filter. Such intelligent use is described below with respect to FIGS. 7-11.

FIG. 7 shows an example machine learning for low-pressure fuel system performance. Plot 700 shows vehicle mileage on the x-axis and normalized orifice area on the y-axis. The plot shows a progression curve 702 from a sensed normalized orifice area $A'_0$ 704 at zero (or near zero) miles to $A'_{eof}$ 706 at an increased vehicle mileage, the curve calculated as described with respect to FIG. 6. Plot 700 shows two consecutive fuel filter clogging sensing events k 708 and k+1 710, the effective orifice area reduction $\delta_k$ can be calculated with a twelfth equation as:

$$\delta_k = c \cdot (A'_k - A_{k+1}) \quad \text{(12) (c is a scaling factor)}$$

In one example, assume there is no fuel refilling event during fuel filter clogging sensing event k and k+1. In such an example, a separate process can be programmed to sample the fuel flow, fuel temperature, engine power, brand of fuel of low-pressure fuel system every 10 seconds. In one example, the fuel brand may be established based on a most recent fuel refilling event. A fuel system usage map may be built using the sampled data of fuel flow, fuel temperature, and engine power to build a fuel system usage map during a filter clogging sensing event k and k+1, as described as follows with respect to FIG. 8.

FIG. 8 illustrates an example fuel system usage map 800. Sampled data of fuel flow, fuel temperature, and engine power are used to build a fuel system usage map during filter clogging sensing event k and k+1, as described above with respect to FIG. 7. Fuel system usage map 800 includes fuel flow bins in 15 liters per hour (lph) increments ranging from 65 lph to 125 lph represented on the x-axis. Fuel temperature bins in 10° C. increments ranging from 20° C. to 60° C. are represented on the y-axis. Accumulated engine power in kilowatts (kW) is indicated with lower accumulated engine power in dark grey to increasing to higher accumulated engine power in light grey. In the example, lowest accumulated engine power is observed during two sets of fuel usage conditions: a first fuel usage condition 802 where fuel temperature between 30° C. and and fuel flow between 80 and 95 lph and a second fuel usage condition 804 when fuel temperature between 50° C. and 60° C. and fuel flow between 80 and 95 lph. Accumulated engine power is greatest during a third fuel usage condition 806 where fuel temperature is between 50° C. and 60° C. and fuel flow is between 95 and 100 lph. In one example, fuel system usage map 800 may be input to a machine learning algorithm including fuel usage maps built in other vehicle systems to build and update intelligent diagnostic models for various vehicle system combinations (e.g., fuel type, fuel system components, operating conditions, etc.).

FIG. 9 illustrates an example communication system 900 for a vehicle system 902 including a system for detecting degradation of low-pressure fuel pump and fuel filter. Vehicle system 902 may communicate data to and receive diagnostic and/or service recommendations from one or more servers 914 via vehicle onboard communication system 903. In the example communication system 900, vehicle onboard communication system 903 includes enhanced central gateway (ECG) module 904 for transmitting vehicle data to and receiving communication from the one or more servers 914 (e.g., remote servers at a central control system). Vehicle onboard communication system 903 includes human machine interaction (HMI) module 906. In one example, HMI module 906 may communicate to a vehicle operator service and/or diagnostic recommendations produced by one or more servers 914 such as an indication to replace the fuel filter and/or to schedule low-pressure fuel pump service.

In one example, when an updated value of effective orifice area reduction $\delta_k$ is available from equation (12), vehicle system 902 generates a record, e.g., datum item. A data structure for a generated record may include: {"Filter brand", "Fuel brand", "Odometer reading", "Fuel system usage map", $\delta_k$}. An example datum item is shown in communication system 900 as data transmitted between elements of the vehicle onboard communication system 903 to servers 914. ECG module 904 included in vehicle onboard communication system 903 transmits data to LTE Modem 908. Data is intercepted at cellular tower 910. Data is transmitted from cellular tower 910 to cloud 912. From cloud 912, data is transmitted to servers 914. In one embodiment, servers 914 receive the record generated by vehicle system 902 via vehicle onboard communication system 903 and data from a plurality of cloud connected vehicles. Data may be assembled to build and/or update machine learning models to explore fuel filter clogging growth for different combinations of fuel filter brand and fuel brand, fuel brand, vehicle mileage, and fuel system usage conditions such as described by a fuel system usage map (e.g., see FIG. 8 and FIG. 10).

Service and/or diagnostic recommendations generated by one or more machine learning models may be transmitted back to vehicle system 902. An example service and/or diagnostic recommendation is shown in communication system 900 as service transmitted between servers 914 to the vehicle onboard communication system 903. From servers 914, the service recommendation may be transmitted to cellular tower 910 via cloud 912. From cellular tower 910, the service recommendation may be transmitted to LTE modem 908. LTE Modem 908 may transmit the service recommendation to ECG module 904, wherefrom HMI module 906 may generate a service recommendation to the vehicle operator. In one example, the diagnostic and/or service recommendation may include one or more of operating an alert light, producing an audio message, and/or producing message on a vehicle interface (e.g., a display device).

As one example, component recommendations may be generated for a vehicle operator of a cloud-connected vehicle, such as vehicle system 902 in an example communication system 900. As one example, a component recommendation, such as a replacement component, may be generated based on a common operating parameter affecting a first component for a vehicle and a second component for the vehicle. The operating parameter may be measured, e.g., over a duration, to differentiate degradation between the first component and the second component. Diagnosing differentiated degradation for the measured operating parameter between the first component and the second component may be based on cloud enabled machine learning. The first component or the second component to the vehicle operator may be recommended based on an output of the cloud enabled machine learning. As another example, the first component for the vehicle may be a first fuel filter and the second component for the vehicle may be a second fuel filter. As another example, the common operating parameter may include a fuel refilling habit or a driving style. An example component recommendation may include a brand of an after-market fuel filter.

Figure 10:
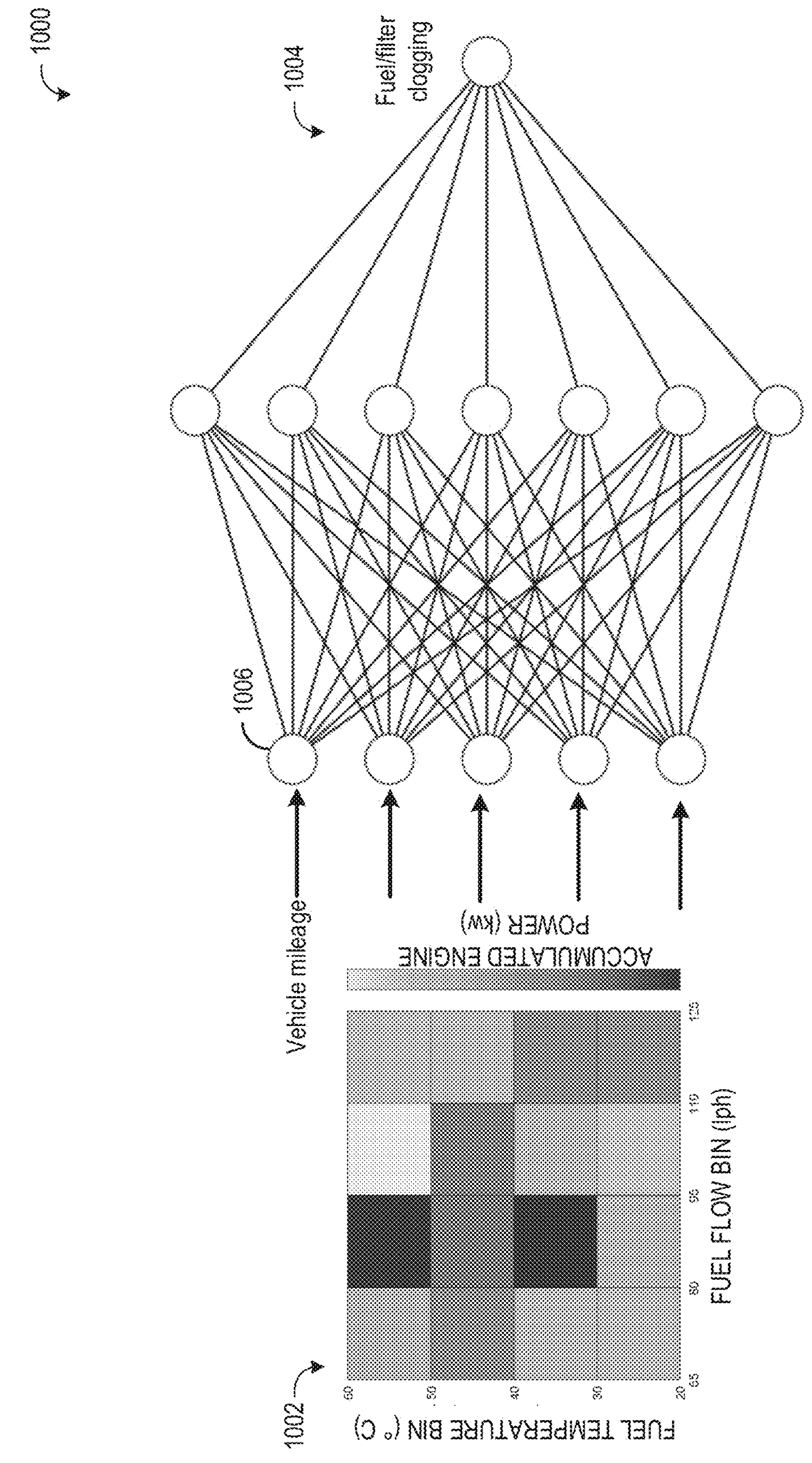
FIG. 10 illustrates a sample machine learning model for an exemplary fuel and filter.
Figure 11:
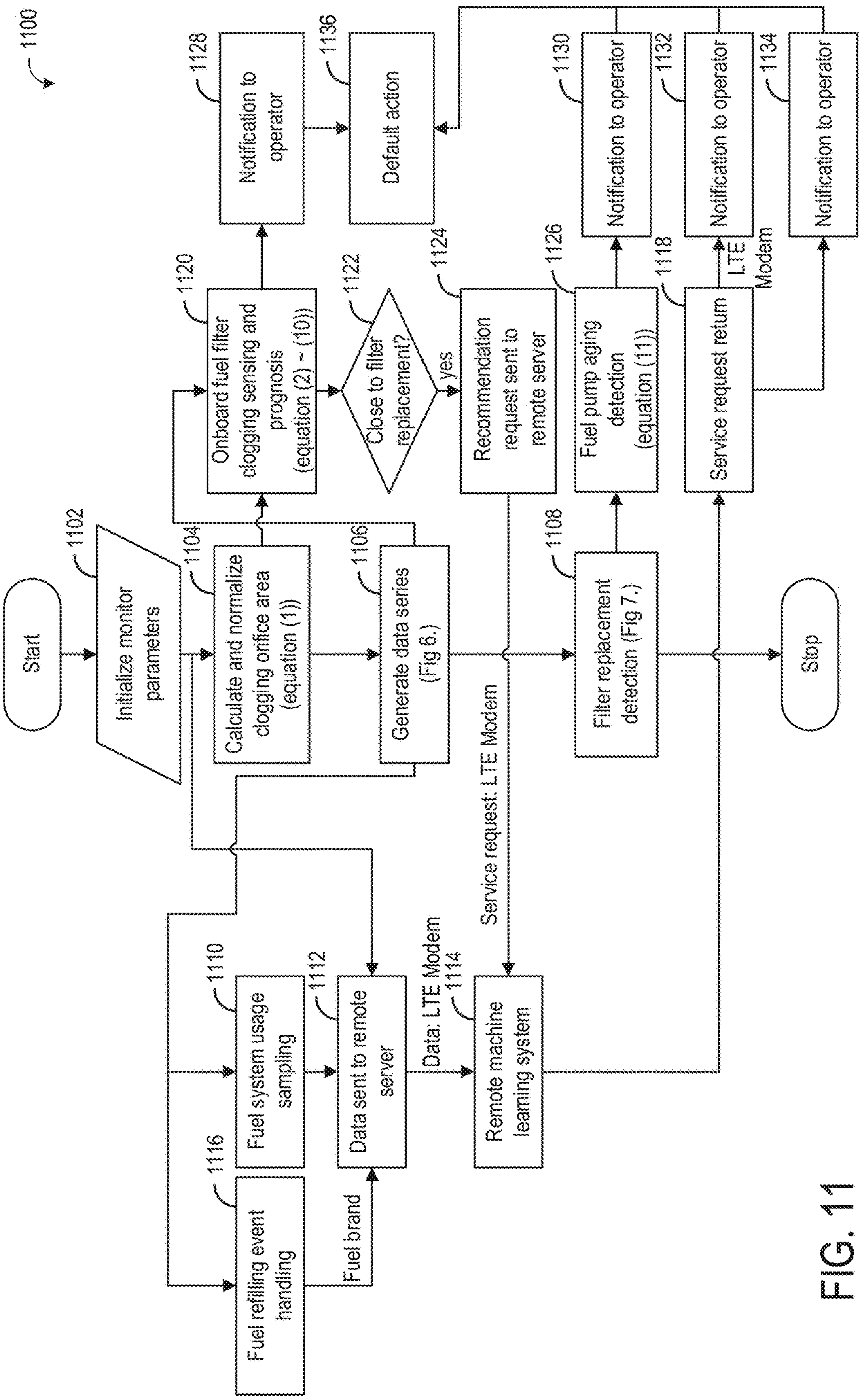
FIG. 11 illustrates a flow chart of a method for a fuel system health monitor.

FIG. 10 illustrates an example machine learning model 1000 for a fuel and fuel filter combination. Various machine learning algorithms may be implemented by a server in cloud communication with a fleet of vehicles (e.g., servers 914 and cloud 912 in FIG. 9). Example machine learning algorithms may include association rule learning, neural network, and so on. Machine learning model 1000 includes neural network 1004 and fuel system usage map 1002. Fuel system usage map 1002 may be the same or similar to fuel system usage map 800 described in FIG. 8.

In one example, a vehicle sends a recommendation request to the server when fuel filter replacement is diagnosed. A sampled recent fuel system usage map data, recent refilling fuel brand history, and vehicle mileage are included in the request. Upon receiving this request, the server will go through a plurality of combinations of fuel brand and fuel filter brand included in a plurality of learning subsystems 1006 of neural network 1004. Learning subsystems 1006 locate the suitable suggestion for the choice of an after-market fuel filter and transmits the recommendation to vehicle through the cloud connected communication system, such as communication system 900 in FIG. 9.

In this way, based on a machine learning system using data obtained from cloud connected vehicles, a manufacturer can gain performance insight into fuel system products. Moreover, the system enables informed improvement of future products and provides a method for more accurately recommending product usage to vehicle operators.

An example control routine for a system for detecting degradation of low-pressure fuel pump and fuel filter is illustrated in method 1100 in FIG. 11. In the present disclosure, method 1100 uses a conceptual orifice area progression with and without fuel filter replacement event to distinguish between pump ageing and filter clogging. The method 1100 further describes the usage of vehicle data to develop intelligent models of vehicle fuel systems including communicating diagnostics and recommendations to vehicle operators. The method 1100 describes implementation of the equations and processes described with respect to FIGS. 3-10. Instructions for carrying out method 1100 and the rest of the methods included herein may be executed by a controller (e.g., control system 190, PCM 214) based on instructions stored on a memory of the controller and in conjunction with signals received from sensors of the vehicle system (temperature sensor 198, pressure sensor 103, P/T combo sensor 224, rail pressure sensor 226, fuel level sensor 222), such as the control system and sensors described above with reference to FIG. 1 and FIG. 2. The controller may employ engine actuators of the engine system to adjust engine operation, according to the methods described below.

At 1102, the method includes initializing monitor parameters. In one example, monitor parameters may include fuel temperature and fuel pressure of a high-pressure pump, fuel level inside a fuel tank, fuel flow demand, output from low-pressure system feedback control, fuel system usage map data, recent refilling fuel brand history, voltage supplied to a low-pressure fuel pump, engine load, engine speed, vehicle speed, odometer reading, crankshaft acceleration, exhaust air fuel ratio, exhaust gas temperature, manifold vacuum, throttle position, spark timing, EGR flow, exhaust pressure, number of activated cylinders, etc.

With monitor parameters initialized, the method continues to 1104 and 1112. At 1104, the method includes calculating and normalizing the orifice area. In one example, calculating and normalizing the orifice area includes inputting vehicle monitor parameters into the equation to calculate orifice area (e.g., the first equation described with respect to FIG. 5). The vehicle operating parameters input into the equation to calculate orifice include: the density for fuel flow, demanded upstream fuel flow (e.g., Ldem), and an output from the low-pressure system feed-back control (e.g. Pfb). In one embodiment, the density for fuel flow, Ldem and Pfb are available signals in the control software for an existing vehicle system and components therein, such as described in FIGS. 1-3.

From parameters initialized at 1102, the method also continues to 1112, where the method includes sending vehicle monitor parameters to a remote server where data may be transmitted via an LTE Modem (e.g., servers 914 and LTE modem 908 in FIG. 9) to a remote machine learning system at 1114 for downstream processing.

Returning to 1104, the method continues to 1106 and 1120. At 1106, the method includes generating a data series including the calculated and normalized orifice area. As one example, when an orifice area is calculated, the corresponding vehicle mileage is recorded. The data series is used to generate a progression curve of normalized orifice area over vehicle mileage, such as described with respect to FIG. 6. Using the progression curve, a distance to filter degradation may be estimated using the tenth equation described with respect to FIG. 6. The estimated orifice area for filter replacement may be set as a first threshold area. In one example, the first threshold area may be nonzero preset threshold.

From 1106, the method continues to 1108, 1110, 1116, and 1120. At 1120, which follows from 1104 and 1106, the method includes onboard fuel filter clogging sensing and prognosis. The normalized orifice area calculated at 1104 using the first equation is compared to the first threshold area set using the progression curve generated at 1106. If normalized orifice area less than the first threshold area is detected, the method continues to 1128 where a notification is generated for the vehicle operator. As one example, the notification may alert and notify the vehicle operator to schedule maintenance service and/or replace the fuel filter for the low-pressure fuel pump. The progression curve generated at 1106 is used at 1110 in fuel system usage sampling and at 1116 in fuel refilling event handling, such as described in FIG. 8 with respect to producing a fuel system usage map. From 1110 and 1116, vehicle data such as fuel brand and sampled fuel system usage map may be transmitted to the remote server at 1112. The method continues to 1114, where the vehicle data is transmitted via the LTE Modem (e.g., servers 914 and LTE modem 908 in FIG. 9) to a remote machine learning system for use in machine learning models on the server side.

Returning to 1120, if normalized orifice area less than the first threshold area is not detected the method continues to 1122. At 1122, if normalized orifice area is close to the first threshold area (e.g., filter replacement not indicated), the method continues to 1124 where a recommendation request may be sent to the remote server, such as described with respect to FIG. 9. As one example, the recommendation request may include vehicle monitoring parameters obtained at 1102 including, for example, a sampled recent fuel system usage map data, recent refilling fuel brand history, and vehicle mileage. From 1124, the method continues to 1114 where the recommendation request is transmitted via the LTE Modem (e.g., servers 914 and LTE modem 908 in FIG. 9) to the remote machine learning system at 1114. Upon receiving the recommendation request, the remote machine learning system processes data in a learning subsystem to find the suitable suggestion for the choice of fuel filter. At 1118, the remote machine learning system returns this recommendation back to vehicle. The remote machine learning system may return the recommendation over LTE modem to notify the operator at 1132 or not over LTE modem to notify the operator at 1134. As one example, the notification may suggest a fuel filter brand to the vehicle operator.

Returning to 1106, the method continues to 1108. At 1108, the method includes filter replacement detection. In one example, using the data series generated at 1106 (e.g., described with respect to FIG. 6), the normalized orifice area for a replacement fuel filter and ageing low-pressure fuel pump (e.g., not new) may be plotted and compared to the normalized orifice area for a new fuel filter and new low-pressure fuel pump. The method continues to 1126 where the method includes detecting fuel pump ageing. Low-pressure fuel pump ageing may be detected by calculating the difference between the normalized orifice area for the fuel system when it includes the new fuel filter and new low-pressure fuel pump to the normalized orifice area for the fuel system when it includes the replaced filter with the same pump. If the normalized area for the replaced fuel filter is less than a second threshold area, the method continues to 1130 where a notification is generated for the vehicle operator. As one example, the notification may alert and notify customer to schedule preventive/maintenance service for the low-pressure fuel pump.

Following notification to operator (e.g., from 1128, 1130, 1132, and 1134) the method continues to 1136. At 1136, the method includes default action. In one example, default action may include making one or more adjustments to engine operation, such as limiting maximum engine power, limiting engine speed, and/or combinations thereof. In one example, default action may include setting a first maximum engine power limit for filter degradation and a setting a second, lower maximum power limit for pump degradation.

In this way, a system for indicating degradation of low-pressure fuel pump and fuel filter detects and models low-pressure fuel pump ageing and fuel filter clogging to provide a health status to a vehicle operator. By simulating orifice degradation using fuel system sensor signals, the system may diagnose and differentiate between fuel filter and low-pressure fuel pump degradation conditions and without external information and/or input. The system may be simple to implement, as it advantages existing sensor hardware and control software for current production vehicles. Moreover, the system is connected and intelligent. By processing fuel system signal data and data from fuel usage maps from a network of cloud connected vehicles, customized diagnostic information and service recommendations may be available to operators based on driving style and refilling habit (e.g., selection of fuel brand). The cloud side machine learning system is constructed in way to facilitate incremental learning, and may continuously learn and update itself based on newly incoming data. Further, by using data from cloud networked vehicles to study trends of fuel system performance using inputs from variables, such as fuel type, driving patterns, etc., the intelligent system may provide useful insight for vehicle manufacturers for future product improvement and may enable potential new business opportunity. The system may enable the manufacturer to provide machine learning based fuel filter replacement and/or fuel system performance improvement recommendation to customer free of charge, thus enhance vehicle ownership experience, or install it as subscription based add-on service, thus enable new business opportunity.

The technical effect of a system for detecting degradation of a low-pressure fuel pump and fuel filter is enabling regular and informed maintenance and preventative service planning with more flexibility, better efficiency, and greater value to customer. A further technical effect is providing useful information and services to additional stakeholders including a vehicle dealer and/or vehicle manufacturer.

The disclosure also provides support for a method for a vehicle engine fuel system, comprising: indicating degradation of each of a low-pressure fuel pump and a fuel filter based on a comparison of a pressure differential between a high-pressure pump pressure setting to an actual pressure and a demanded fuel flow to an engine, the indication distinguishing between pump ageing and filter degradation. In a first example of the method, the method further comprises: adjusting operation of the low-pressure fuel pump in response to the comparison of the high-pressure pump pressure setting and pressure of fuel entering a high-pressure pump. In a second example of the method, optionally including the first example, the fuel filter is positioned to filter fuel drawn from a fuel tank before entering the low-pressure fuel pump. In a third example of the method, optionally including one or both of the first and second examples, the method further comprises: adjusting operation of the low-pressure fuel pump in response to the comparison of the high-pressure pump pressure setting and pressure of fuel entering the high-pressure pump, and further based on a feed-forward adjustment of the high-pressure pump pressure setting. In a fourth example of the method, optionally including one or more or each of the first through third examples, the method further comprises: taking default action to adjust engine operation in response to the indication and the distinguishing between pump ageing and filter degradation. In a fifth example of the method, optionally including one or more or each of the first through fourth examples, the indication is further based on a predetermined relationship between a normalized orifice area estimated with an undegraded low-pressure fuel pump and an undegraded filter and degraded filter over vehicle miles, the predetermined relationship utilized to generate a real-time estimate of normalized orifice area during vehicle operation. In a sixth example of the method, optionally including one or more or each of the first through fifth examples, the real-time estimate of normalized orifice area decreases to below a threshold to indicate filter replacement, and upon filter replacement, the real-time estimate of normalized orifice area is captured for comparison with previous real-time estimates of normalized orifice area at previous filter replacements to generate an ageing estimate of the low-pressure fuel pump, degradation of the low-pressure fuel pump indicated based on the ageing estimate. In a seventh example of the method, optionally including one or more or each of the first through sixth examples, the ageing estimate of the low-pressure fuel pump and the fuel filter is based on a machine learning model and a fuel system usage map based on fuel flow and fuel temperature. In an eighth example of the method, optionally including one or more or each of the first through seventh examples, the ageing estimate of the low-pressure fuel pump and the fuel filter is based on a cloud-sourced data structure including filter brand, fuel brand, mileage, and the fuel system usage map. In a ninth example of the method, optionally including one or more or each of the first through eighth examples, the method further comprises: generating a suggestion for a type of fuel filter to replace a determined degraded fuel filter.

The disclosure also provides support for a method for generating a component recommendation to a vehicle operator, comprising: measuring an operating parameter to differentiate degradation between a first component and a second component, the operating parameter affecting the first component for a vehicle and the second component for the vehicle, diagnosing differentiated degradation for the measured operating parameter between the first component and the second component based on cloud enabled machine learning, and recommending replacement, including a brand, of the first component or the second component to the vehicle operator based on an output of the cloud enabled machine learning. In a first example of the method, recommending the first component or the second component includes recommending a replacement component. In a second example of the method, optionally including the first example, the first component for the vehicle is a first fuel filter and the second component for the vehicle is a second fuel filter. In a third example of the method, optionally including one or both of the first and second examples, the operating parameter is a fuel refilling habit. In a fourth example of the method, optionally including one or more or each of the first through third examples, the operating parameter is a driving style.

The disclosure also provides support for a vehicle system, comprising: a vehicle engine fuel system including a low-pressure fuel pump, a high-pressure fuel pump, and a fuel filter, and a control system with instructions therein configured for, when executed, indicating degradation of each of the low-pressure fuel pump and the fuel filter based on a comparison of a pressure differential between a high-pressure pump pressure setting to an actual pressure and a demanded fuel flow to an engine, the indication distinguishing between pump ageing and filter degradation. In a first example of the system, the system further comprises: a fuel tank, wherein the fuel filter is positioned to filter fuel drawn from the fuel tank before entering the low-pressure fuel pump. In a second example of the system, optionally including the first example, the instructions further include instructions for adjusting operation of the low-pressure fuel pump in response to the comparison of the high-pressure pump pressure setting and pressure of fuel entering the high-pressure pump, and further based on a feed-forward adjustment of the high-pressure pump pressure setting. In a third example of the system, optionally including one or both of the first and second examples, the instructions further include instructions for taking default action to adjust engine operation in response to the indication and the distinguishing between pump ageing and filter degradation. In a fourth example of the system, optionally including one or more or each of the first through third examples, the indication is further based on a predetermined relationship between a normalized orifice area estimated with an undegraded low-pressure fuel pump and an undegraded filter and degraded filter over vehicle miles, the predetermined relationship utilized to generate a real-time estimate of normalized orifice area during vehicle operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle engine fuel system diagnoses, comprising:

indicating degradation of each of a low-pressure fuel pump and a fuel filter based on a comparison between a pressure differential and a demanded fuel flow to an engine, the indication distinguishing between low-pressure fuel pump degradation and filter degradation, the pressure differential being a difference between a pressure setting at an inlet of a high-pressure pump and an actual pressure of the high-pressure pump, the demanded fuel flow to the engine being a flow of fuel estimated to maintain the pressure setting at the inlet of the high-pressure pump, and wherein the actual pressure is measured by a high-pressure pump pressure and temperature sensor coupled to the high-pressure pump.

2. The method of claim 1, further comprising adjusting operation of the low-pressure fuel pump in response to the comparison of the pressure setting at the inlet of the high-pressure pump and pressure of fuel entering a high-pressure pump.

3. The method of claim 1, wherein the fuel filter is positioned to filter fuel drawn from a fuel tank before entering the low-pressure fuel pump.

4. The method of claim 1, further comprising adjusting operation of the low-pressure fuel pump in response to the comparison of the pressure setting at the inlet of the high-pressure pump and pressure of fuel entering the high-pressure pump, and further based on a feed-forward adjustment of the pressure setting at the inlet of the high-pressure pump.

5. The method of claim 1, further comprising taking default action to adjust engine operation in response to the indication and the distinguishing between low-pressure fuel pump degradation and filter degradation.

6. The method of claim 1, wherein the indication is further based on a predetermined relationship between a normalized orifice area estimated with an undegraded low-pressure fuel pump and an undegraded filter and degraded filter over vehicle miles, the predetermined relationship utilized to generate a real-time estimate of normalized orifice area during vehicle operation.

7. The method of claim 6, wherein the real-time estimate of normalized orifice area decreases to below a threshold to indicate filter replacement, and upon filter replacement, the real-time estimate of normalized orifice area is captured for comparison with previous real-time estimates of normalized orifice area at previous filter replacements to generate an ageing estimate of the low-pressure fuel pump, degradation of the low-pressure fuel pump indicated based on the ageing estimate.

8. The method of claim 7, wherein the ageing estimate of the low-pressure fuel pump and the fuel filter is based on a machine learning model and a fuel system usage map based on fuel flow and fuel temperature.

9. The method of claim 8, wherein the ageing estimate of the low-pressure fuel pump and the fuel filter is based on a cloud-sourced data structure including filter brand, fuel brand, mileage, and the fuel system usage map.

10. The method of claim 1, further comprising generating a suggestion for a type of fuel filter to replace a determined degraded fuel filter.

11. A method for generating a component recommendation to a vehicle operator, comprising:

measuring an operating parameter to differentiate degradation between a first component and a second component, the operating parameter affecting the first component for a vehicle and the second component for the vehicle;

diagnosing differentiated degradation for the measured operating parameter between the first component and the second component based on cloud enabled machine learning; and recommending replacement, including a brand, of the first component or the second component to the vehicle operator based on an output of the cloud enabled machine learning, wherein the operating parameter is at least one of a fuel refiling habit and a driving style.

12. The method of claim 11, wherein recommending the first component or the second component includes recommending a replacement component.

13. The method of claim 11, wherein the first component for the vehicle is a first fuel filter and the second component for the vehicle is a second fuel filter.

14. A vehicle system, comprising:

a vehicle engine fuel system including a low-pressure fuel pump, a high-pressure fuel pump, and a fuel filter; and a control system with instructions therein configured for, when executed, indicating degradation of each of the low-pressure fuel pump and the fuel filter based on a comparison between a pressure differential and a demanded fuel flow to an engine, the indication distinguishing between low-pressure fuel pump degradation and filter degradation, the pressure differential being a difference between a pressure setting at an inlet of a high-pressure pump and an actual pressure of the high-pressure pump, wherein the demanded fuel flow to the engine is a flow of fuel estimated to maintain the pressure setting at the inlet of the high-pressure pump, wherein the actual pressure is measured by a high-pressure pump pressure and temperature sensor coupled to the high-pressure pump.

15. The system of claim 14, further comprising a fuel tank, wherein the fuel filter is positioned to filter fuel drawn from the fuel tank before entering the low-pressure fuel pump.

16. The system of claim 15, wherein the instructions further include instructions for adjusting operation of the low-pressure fuel pump in response to the comparison of the pressure setting at the inlet of the high-pressure pump and pressure of fuel entering the high-pressure pump, and further based on a feed-forward adjustment of the pressure setting at the inlet of the high-pressure pump.

17. The system of claim 16, wherein the instructions further include instructions for taking default action to adjust engine operation in response to the indication and the distinguishing between low-pressure fuel pump degradation and filter degradation.

18. The system of claim 17, wherein the indication is further based on a predetermined relationship between a normalized orifice area estimated with an undegraded low-pressure fuel pump and an undegraded filter and degraded filter over vehicle miles, the predetermined relationship utilized to generate a real-time estimate of normalized orifice area during vehicle operation.

* * * * *